United States Patent [19]
Komiyama et al.

[11] Patent Number: 5,344,736
[45] Date of Patent: Sep. 6, 1994

[54] DISAZO ELECTROPHOTOGRAPHIC PHOTORECEPTOR

[75] Inventors: Nakaji Komiyama, Kawaguchi; Hisao Kouno, Funabashi; Kazuhiro Higashide, Kawaguchi; Osamu Suda, Ohmiya; Masaru Hasegawa, Tokyo, all of Japan

[73] Assignee: Dainichiseika Color & Chemicals Mfg. Co., Ltd., Tokyo, Japan

[21] Appl. No.: 25,170

[22] Filed: Mar. 2, 1993

[51] Int. Cl.$^5$ .................. G03G 5/06; G03G 5/09
[52] U.S. Cl. ............................. 430/83; 430/70; 430/72; 430/75; 430/76; 430/78; 430/79; 430/58
[58] Field of Search .............. 430/70, 72, 75, 76, 430/78, 79, 58, 83

[56] References Cited

U.S. PATENT DOCUMENTS

| 4,247,614 | 1/1981 | Ohta et al. | 430/79 |
| 4,314,016 | 2/1982 | Ohta et al. | 430/79 X |

FOREIGN PATENT DOCUMENTS

| 37353 | 2/1988 | Japan | 430/78 |
| 68843 | 3/1988 | Japan | 430/78 |
| 169648 | 7/1988 | Japan | 430/76 |
| 2059 | 1/1989 | Japan | 430/75 |
| 174540 | 7/1991 | Japan | 430/75 |
| 179359 | 8/1991 | Japan | 430/75 |

Primary Examiner—Roland Martin
Attorney, Agent, or Firm—Martin A. Farber

[57] ABSTRACT

An electrophotographic photoreceptor is provided with a photosensitive layer, which contains an azo compound represented by the following g general formula (1):

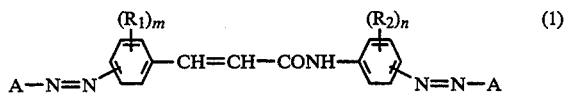

wherein A means a coupler residuum having phenolic OH radicals, $R_1$ and $R_2$ designate, respectively, a radical of an integer of, both, $m=0\sim4$, $n=0\sim4$, selected from the group consisting of hydrogen, halogen atoms, alkyl group, alkoxy group, and di-substituted amino group.

The electrophotographic photoreceptor of this invention has excellent electrification characteristics, sensitivity characteristics and image-forming property as well as good sensitivity. In addition, its sensitivity and electrification characteristics undergo less variations even when employed repeatedly. It also undergoes little light-induced fatigue. It has high weatherability.

8 Claims, No Drawings

DISAZO ELECTROPHOTOGRAPHIC PHOTORECEPTOR

BACKGROUND OF THE INVENTION

1. Field of the Invention

This invention relates to an electrophotographic photoreceptor, and more specifically to a novel electrophotographic photoreceptor provided with a photosensitive layer which contains a specific azo compound.

2. Description of the Related Art

In recent years, the utility of electrophotography is not limited to the field of copying machines but has expanded to various other fields where photographic techniques have conventionally been used, such as printing plates, slide films and microfilms. Investigations are also under way in order to apply electrophotography to high-speed printers which make use of a laser or LED as a light source. The demand is hence moving toward a wide variety of electrophotographic photoreceptors of higher quality.

As photoreceptors for electrophotography, those having a photosensitive layer composed of an inorganic photoconductive material such as amorphous selenium, cadmium sulfide or zinc oxide as a principal component have been used primarily to date. Although photoreceptors formed of these inorganic materials are useful, they are still accompanied by various drawbacks.

With a view toward making improvements to the above drawbacks, electrophotographic photoreceptors making use various organic materials as photoconductive materials have been proposed and have started finding practical utility in recent years. Needless to say, an electrophotographic photoreceptor must have both carrier producing function and carrier transporting function. As organic compounds usable as carrier producing materials, numerous pigments have been proposed such as phthalocyanine type pigments, polycyclic quinoline type pigments, indigo type pigments, dioxazine type pigments, quinacridone type pigments and azo type pigments. There are however very few pigments which have been put to practical use. Since a carrier transporting substance can be chosen only from a limited range, it has not been obtained under the circumstances any carrier transporting substance which can meet satisfactorily the diversified demands for the electrophotographic process.

SUMMARY OF THE INVENTION

The present inventors have carried out an investigation with a view toward making improvements to organic electrophotographic photoreceptors. As a result, it has been found that an electrophotographic photoreceptor provided with a photosensitive layer containing an azo compound represented by the following general formula (1), has super electrophotographic characteristics, leading to the present invention.

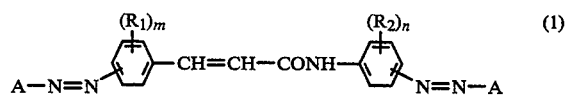
(1)

wherein A means a coupler residuum having phenolic OH radicals, $R_1$ and $R_2$ designate, respectively, a radical of an integer of, both, m=0~4, n =0~4, selected from the group consisting of hydrogen, halogen atoms, alkyl group, alkoxy group, and di-substituted amino group.

The electrophotographic photoreceptor of this invention has excellent electrification characteristics, sensitivity characteristics and image forming property as well as good sensitivity. In addition, its sensitivity and electrification characteristics undergo less variations even when employed repeatedly. It also undergoes little light-induced fatigue. It has high weatherability.

The above objects, features and advantages of the present invention will become apparent from the following description and the appended claims.

DETAILED DESCRIPTION OF THE INVENTION AND PREFERRED EMBODIMENTS

The examples of the azo compounds usable in the present invention represented by said general formula (1) are designated as follows. But, the scope of the present invention is not limited by these examples.

| | Exemplified Compounds (Compound NO. 1-56) |
|---|---|
| Basical structure | Structure |
| I | A—N=N—⟨ ⟩—CH=CH—CONH—⟨ ⟩—N=N—A |
| II | A—N=N—⟨ ⟩—CH=CH—CONH—⟨ ⟩—N=N—A |
| III | ⟨ ⟩—CH=CH—CONH—⟨ ⟩—N=N—A <br> A—N=N |

-continued
Exemplified Compounds (Compound NO. 1–56)
IV 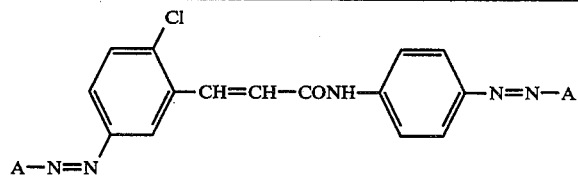
V 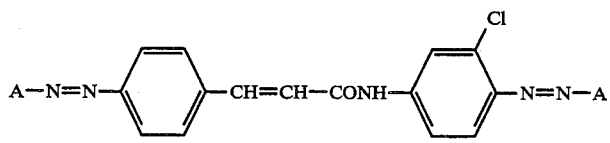
VI 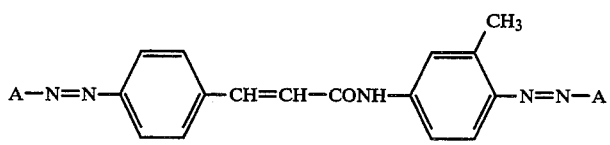
VII 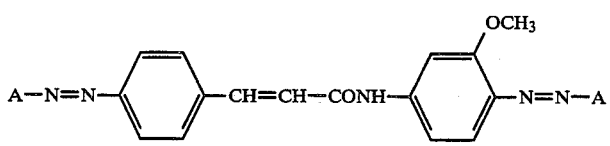
| Compound NO. | Basical structure | A |
|---|---|---|
| 1 | I | 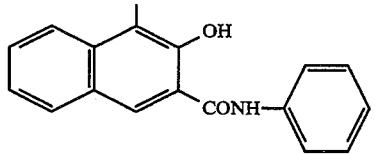 |
| 2 | I | 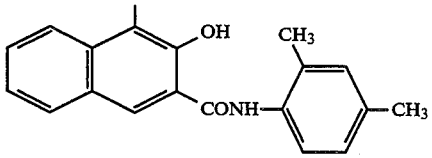 |
| 3 | I | 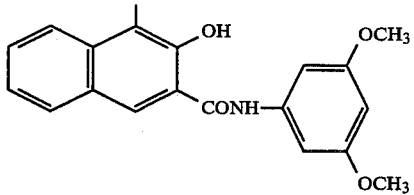 |
| 4 | I | 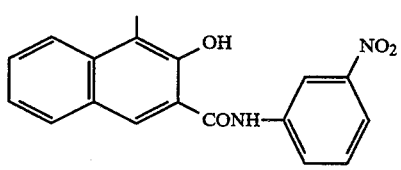 |
| 5 | I | 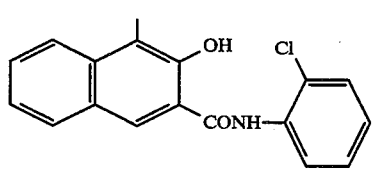 |

| | | Exemplified Compounds (Compound NO. 1-56) |
|---|---|---|
| 6 | I | 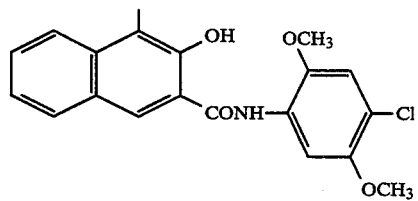 |
| 7 | I | 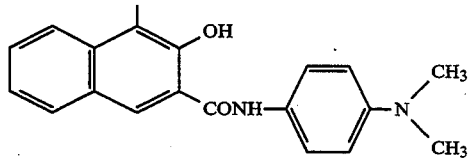 |
| 8 | I | 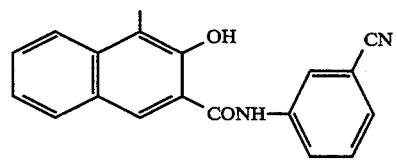 |
| 9 | I | 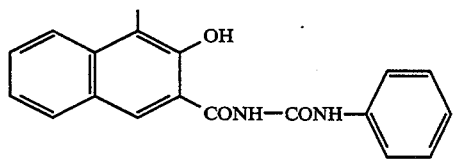 |
| 10 | I | 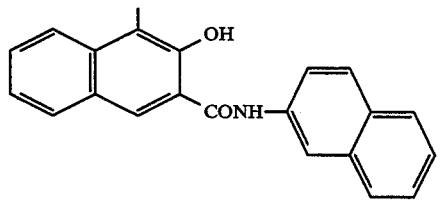 |
| 11 | I | 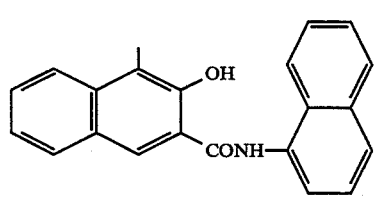 |
| 12 | I | 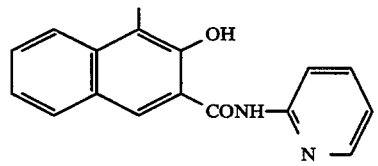 |
| 13 | I | 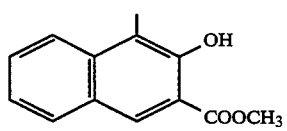 |
| 14 | I | 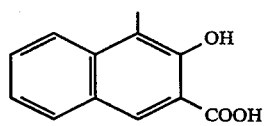 |

-continued
Exemplified Compounds (Compound NO. 1–56)
15 I 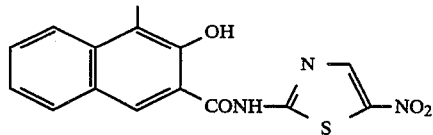
16 I 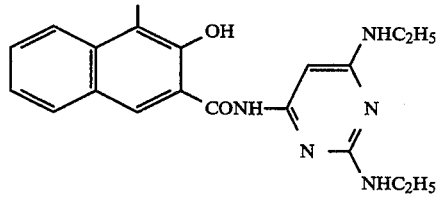
17 I 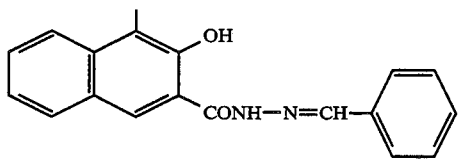
18 I 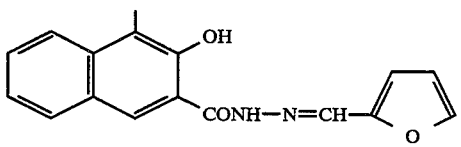
19 I 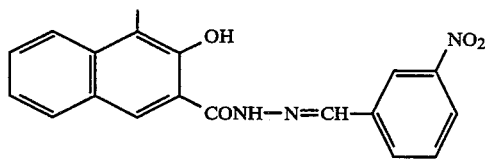
20 I 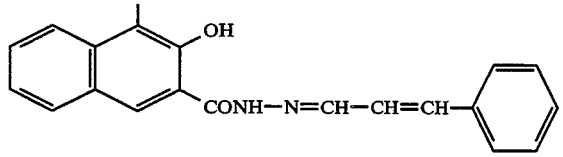
21 I 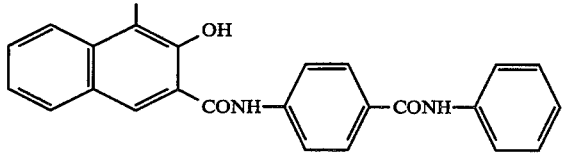
22 I 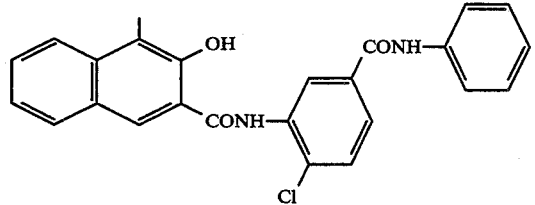

-continued
Exemplified Compounds (Compound NO. 1–56)
| 23 | I | 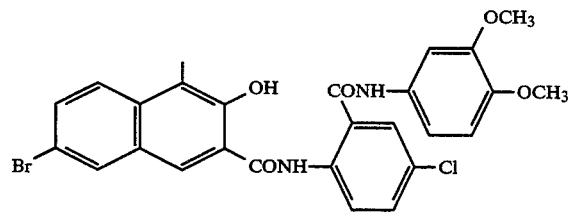 |
| 24 | I | 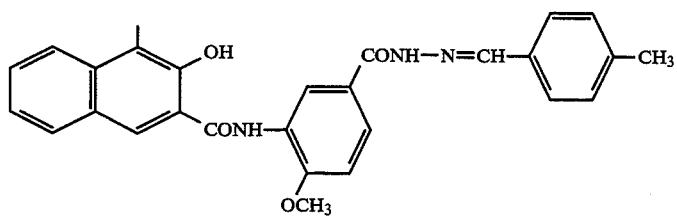 |
| 25 | I | 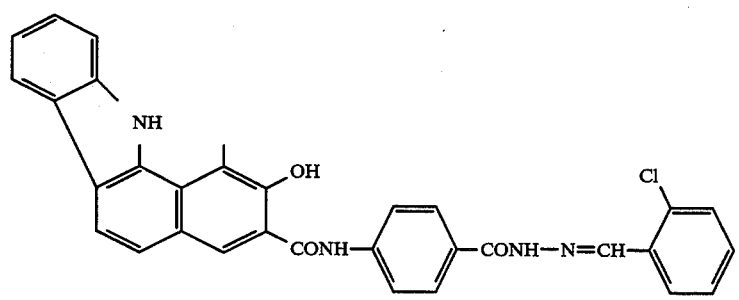 |
| 26 | I | 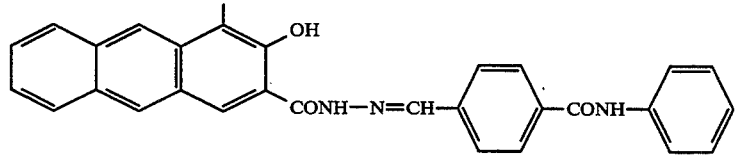 |
| 27 | I | 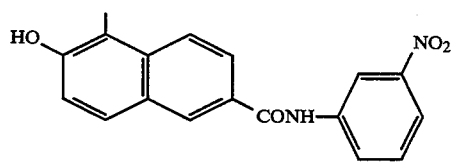 |
| 28 | I | 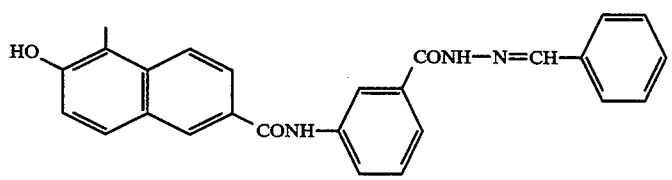 |
| 29 | II | 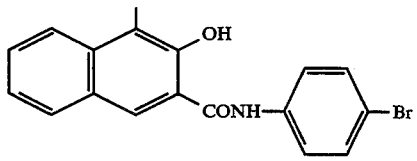 |

| | | Exemplified Compounds (Compound NO. 1–56) |
|---|---|---|
| 30 | II | 3-hydroxy-4-methyl-dibenzofuran-2-carboxylic acid (2'-methyl-2''-hydroxy-biphenyl-4-yl)amide |
| 31 | II | 3-hydroxy-7-methoxy-4-methyl-naphthalene-2-carboxylic acid [2-chloro-5-(phenylcarbamoyl)phenyl]amide |
| 32 | II | 3-hydroxy-4-methyl-naphthalene-2-carboxylic acid [2-(2-chlorophenyl)ethyl]amide |
| 33 | II | 3-hydroxy-4-methyl-naphthalene-2-carboxylic acid phenylamide |
| 34 | II | N-methyl-4,9-dihydroxy-5,10-dimethyl-naphthalene-1,8-dicarboximide |
| 35 | III | 3-hydroxy-4-methyl-naphthalene-2-carboxylic acid (4-chlorophenyl)amide |
| 36 | III | 3-hydroxy-4-methyl-naphthalene-2-carboxylic acid (2-methoxyphenyl)amide |
| 37 | III | 3-hydroxy-4-methyl-naphthalene-2-carboxylic acid (4-methylphenyl)amide |

-continued
Exemplified Compounds (Compound NO. 1-56)
| 38 | III | 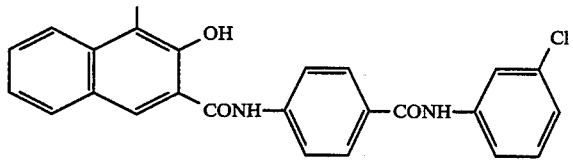 |
| 39 | III | 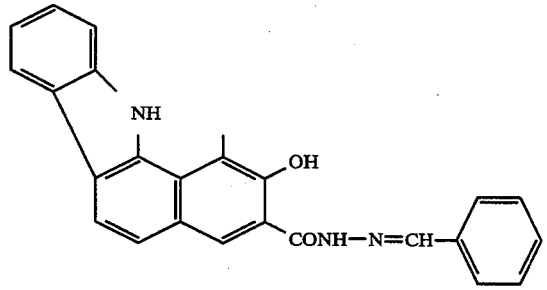 |
| 40 | III | 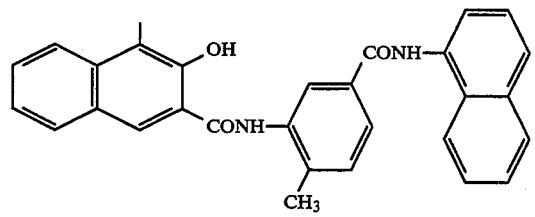 |
| 41 | IV | 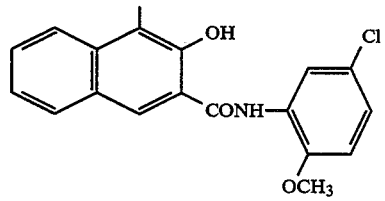 |
| 42 | IV | 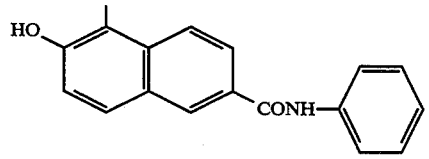 |
| 43 | IV | 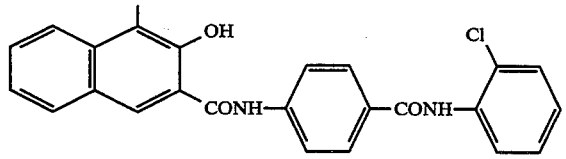 |
| 44 | IV | 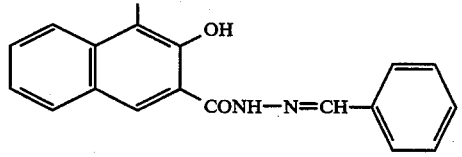 |
| 45 | V | 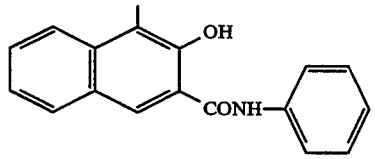 |

-continued
Exemplified Compounds (Compound NO. 1-56)
| 46 | V | 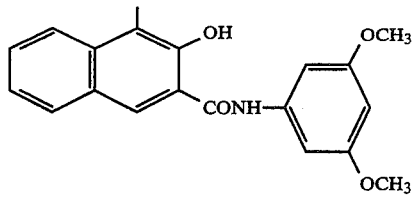 |
| 47 | V | 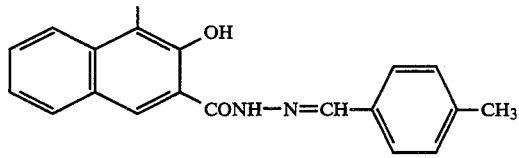 |
| 48 | V | 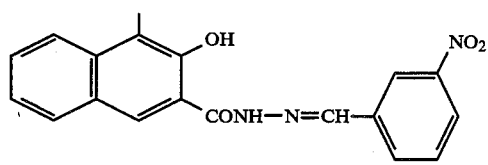 |
| 49 | VI | 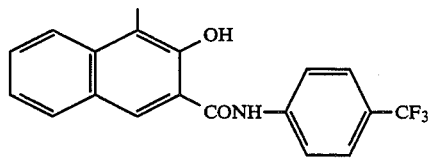 |
| 50 | VI | 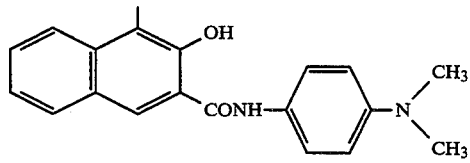 |
| 51 | VI | 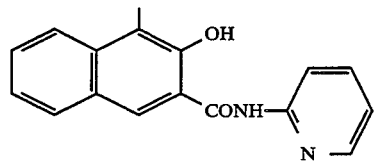 |
| 52 | VI | 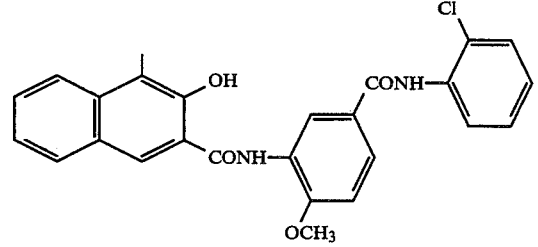 |
| 53 | VII | 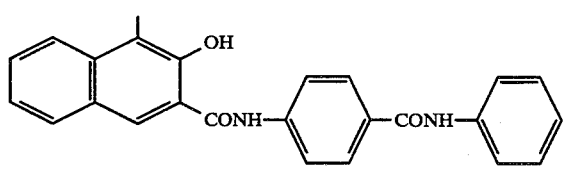 |

-continued
Exemplified Compounds (Compound NO. 1-56)

54 VII

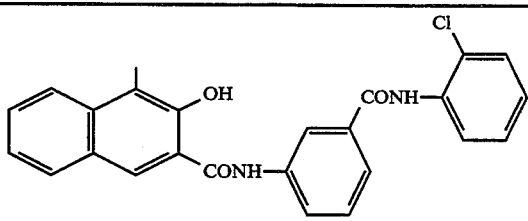

55 VII

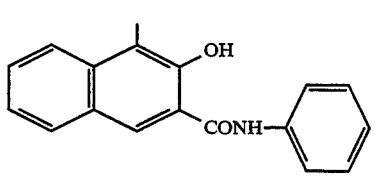

56 VII

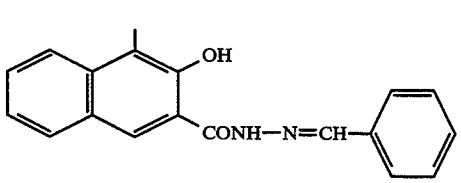

The above compounds can each he synthesized by a known process. A starting compound, i.e., an amine represented by the general formula (2),

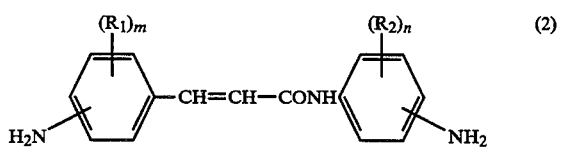

wherein $R_1$ and $R_2$ designate, respectively, a radical of an integer of, both, $m=0 \sim 4$, $n=0 \sim 4$, selected from the group consisting of hydrogen, halogen atoms, alkyl group, alkoxy group, and di-substituted amino group, is first diazotized by a method known per se in the art and the resulting diazonium salt is coupled with a coupler residuum of the corresponding coupler in the presence of an alkali, or the resulting diazonium salt is coupled with a coupler in a suitable solvent, such as N,N-dimethylformamide, in the presence of alkali, after it is stabilized in the form of, for example, borofluoride salt etc., and once isolated.

One synthesis example will hereinafter be described, in which all designations of "part" and "parts" and "%" mean part and parts by weight and wt.%.

The scope of the present invention does not be limited by the examples.

SYNTHESIS EXAMPLE

Exemplified Compound 1

8,9 parts of 4-amino-(4'-aminocinnamate) anilide is dispersed in hydrochloric acid solution of 150 parts of 35% concentrated hydrochloric acid and 130 parts of water. The obtained mixture is cooled to 0° C. Then, 60 parts of 10% aqueous solution of sodium nitrite were added dropwise thereinto over 15 minutes at $-3 \sim 2°$ C. After completion of the dropwise addition, the mixture is stirred for about 30 minutes at the same temperature, and small amounts of unreacted materials are separated by filtration. Then, 35 parts of 42% borofluoric acid are added into the obtained fillrate, and, the resultant precipitates are separated by filtration, washed with cold water, and dryed to obtain 13.0 parts of diazonium salt. (yield: 82%)

Thereafter, 7.4 parts of the obtained diazonium salt are dissolved into 600 parts of N,N-dimethylformamide together with 8.7 parts of naphthol AS as a grounder. Then, 30 parts of 10% aqueous solution of sodium acetate are added dropwise into the solution at a room temperature over 15 minutes, followed by stirring for 3 hours at the same temperature. After completion of the dropwise addition, the resultant precipitates are collected by filtration. They are washed successively with N,N-dimethylformamide, methanol and water, and then dryed to obtain 15.1 parts of disazo compound of Exemplified Compound 1. (yield: 83%)

The physical construction of the electrophotografic photoreceptor of this invention may take any one of forms known to date. On a conductive substrate, a carrier producing layer composed principally of the above azo compound as a carrier producing substance and a carrier transporting layer composed principally of a carrier transporting substance may be laminated. As an alternative, a photosensitive layer formed by dispersing a carrier producing substance in a carrier transporting substance may be provided on such a conductive substance. These layers may be provided with an intermediate layer interposed therebetween. The following patterns may be therefore be feasible by way of example.

I) substrate/carrier producing layer/carrier transporting layer.
II) substrate/carrier transporting layer/carrier producing layer.
III) substrate/carrier transporting layer containing a carrier producing substance.
IV) substrate/intermediate layer/carrier producing layer/carrier transporting layer.
V) substrate/intermediate layer/carrier transporting layer/carrier producing layer.
VI) substrate/intermediate layer/carrier transporting layer containing a carrier producing substance.

The term "intermediate layer" as used herein means a barrier layer or bonding layer. For the purpose of surface protection or the like, a thin layer may also be provided on an electrophotographic photoreceptor of any one of the above construction patterns.

Carrier transporting substances include those transporting electrons and those transporting holes. Both types of carrier transporting substances may be used for the formation of electrophotographic photoreceptors according to this invention.

Electrophotographic photoreceptors according to this invention can be produced by a usual method in accordance with techniques known in the production of electrophotographic photoreceptors making use of an organic photoconductive substance. For example, a carrier producing layer forming a photosensitive layer of a double-layered structure may he formed by grinding any one of the above azo compounds into fine particles in a suitable medium, adding a binder as needed, applying the resultant coating formulation on a conductive substrate either directly or with an intermediate layer interposed therebetween or applying the coating formulation on a carrier transporting layer formed in advance, and then drying the thus-applied coating formulation.

It is necessary to grind the azo compound into fine particles of 5 $\mu$ or smaller, preferably 3 $\mu$, most preferably 1 $\mu$ so that the fine particles are dispersed uniformly in the medium. When a binder is employed, no particular limitation is imposed thereon. It is however preferable to use as a binder a film-forming high molecular compound which is hydrophobic and electrically insulating and has a high dielectric constant. Various kinds of thermoplastic and thermosetting synthetic resins may he used suitably. As is understood easily, it is convenient if the above medium has ability to dissolve the binder. The binder may be used in an amount selected from a range of 0.1~5 times in weight the carrier producing substance described above. The thickness of the carrier producing layer may be controlled to a range of 0.01~20 $\mu$ with 0.05~5 $\mu$ being preferred.

The carrier transporting layer can be formed by either dispersing or dissolving a carrier transporting substance in a suitable medium, coating the resultant dispersion or solution, and then drying same. It is preferred to use a binder except where the carrier transporting substance itself can also serve as a binder like poly-N-vinylcarbazole or poly-N-glycidylcarbazole. The binder may be of the same type as that used for the formation of the carrier producing layer. It is suitable to use the binder in an amount 0.2~5 times in weight tile carrier transporting substance. The thickness of the carrier transporting layer may be within a range of 1~50 $\mu$ with 10~30 $\mu$ being preferred.

In order to form a carrier producing layer-carrier transporting layer of the dispersion type on the other hand, it is only necessary to dissolve or disperse the carrier transporting substance in the above-described dispersion for the formation of the carrier producing layer and then to apply the resulting coating formulation on a conductive substrate. Although any carrier transporting substance may he chosen as desired, it is generally preferable to add a binder except where a carrier transporting substance also useful as a binder is used. When an intermediate layer is provided between the conductive substrate and the laminated or dispersed photosensitive layer, the intermediate layer is composed of one or more of a carrier producing substance, carrier transporting substance, binder, additives, etc. They are materials employed commonly in the art and are used in amounts not impairing the function as an intermediate layer. The film thickness is 10 $\mu$ or thinner, preferably, 1 $\mu$ or thinner.

Other known techniques may also be applied to the electrophotographic photoreceptor of the present invention. For example, the photosensitive layer may contain a sensitizer. As suitable sensitizers, may be mentioned Lewis acids capable of forming charge transfer complexes with organic photoconductive substances, dyes, pigments, etc. It is also possible to incorporate additives such as plasticizer, ultraviolet absorbent, oxidation inhibitor, lubricant, bonding accelerator, dispersant and leveling agent with a view toward improving the film-forming property, flexibility, mechanical strength, etc. of the photo-sensitive layer. Within ranges not impairing the electrophotographic photoreceptor characteristics intended in the present invention, a carrier producing substance and carrier transporting substance may be added.

As a method for forming the carrier producing layer and carrier transporting layer as well as the intermediate layer and surface layer, usual coating methods may be used in the present invention, such as, dip coating, spray coating, spinner coating, bead coating, wire-wound drawdown bar coating, blade coating, roll coating, and cartain coating.

As will also become apparent from Examples to be described next, the electrophotographic photoreceptor of this invention has excellent electrification characteristics, sensitivity characteristics and image-forming property as well as good sensitivity. In addition, its sensitivity and electrification characteristics undergo less variations even when employed repeatedly. It also undergoes little light-induced fatigue. It has high weatherability.

The present invention will next be described more specifically by the following Examples, in which all designations of "part" and "parts" mean part by weight and parts by weight.

EXAMPLE 1

One part of Exemplified Compound 1, described above, and 1 part of a polyester resin ["Vyron 200"(trade name): product of Tokyo Co., Ltd.] were dispersed thoroughly in 50 parts of tetrahydrofuran by means of a ball mill. A dispersion thus obtained was coated on an aluminum sheet by a wire coater and then dried for 30 minutes with hot air of 120° C. to provide a carrier producing layer of 0.3 $\mu$ thick.

Coated over the carrier producing layer was a solution which had been obtained by dissolving 5 parts of p-diethylaminobenzaldehyde-N-phenyl-N-benzyl-hydrazone and 5 parts of a polycarbonate resin ["Panlite L-1250", trade name; product of Teijin Chemicals Ltd.] in 70 parts of 1,2-dichloroethane. The solution was dried for 3 hours with warm air of 60° C., thereby forming a carrier transporting layer of 20 $\mu$ thick.

A photoreceptor thus fabricated was left over in an atmosphere of 25° C. and 55% R.H. (relative humidity) to adjust its humidity. Using a static paper testing apparatus ("SP-428", trade name: manufactured by gawaguchi Denki Seisakusho K.K.), it was thereafter corona-charged at a voltage of −5 KV by the static method. After holding it for 10 seconds in a dark place, it was exposed to light from a tungsten lamp as a light source in such a way that the illuminance became 5.0 lux on the sample surface, whereby its electrophotographic characteristics were evaluated. The following results were obtained.

$V_D$: −700 (v)
$V_{D10}$(percentage of potential retained for 10 seconds in a dark place) : 89 (%)
$E_{\frac{1}{2}}$(half decay exposure) :2.7(lux-sec)

EXAMPLE 2

A photoreceptor was fabricated in the same manner as in Example 1 except for the use of Exemplified Compound 2. Its characteristics were measured in the same manner as in Example 1. The following results were obtained.

$V_D$: −700 (v)
$V_{D10}$: 86 (%)
$E_{\frac{1}{2}}$: 2.5(lux-sec)

EXAMPLE 3

Exemplified Compound 3 (1 part) and 1 parts of a polyester resin ["Vyron 200"(trade name): product of Toyoho C., Ltd.] were dispersed thoroughly in 250 parts of 1,2-dichloroethane by means of a ball mill. A dispersion thus obtained was coated on an aluminum-deposited polyester film and then dried for 30 minutes with hot air of 120° C. to provide a carrier producing layer of 0.5 μ thick.

Coated over the carrier producing layer was a solution which had been obtained by dissolving 10 parts of 9-ethylcarbazole-3-carbaldehydeN,N-diphenyl-hydrazone and 10 parts of a polyester resin ("Vylon 200" described above) in 100 parts of 1,2-dichloro-ethane. The solution was dried for 3 hours with warm air of 60° C., thereby forming a carrier transporting layer of 19 μ thick.

Characteristics of the electrophotographic photoreceptor were measured. The following results were obtained.

$V_D$: −690 (v)
$V_{D10}$: 91 (%)
$E_{\frac{1}{2}}$: 3.1(lux-sec)

EXAMPLE 4

2 parts of Exemplified Compound 5, described above, and 1 part of a polyester resin ["Vyron 200"(trade name): product of Tokyo Co.,Ltd.] were dispersed thoroughly in 80 parts of tetrahydrofuran by means of a ball mill. A dispersion thus obtained was coated on an aluminum-deposited polyester film and then dried for 30 minutes with hot air of 120° C. to provide a carrier producing layer of 0.5 μ thick.

Coated over the carrier producing layer was a solution which had been obtained by dissolving 12 parts of hydrazone compound shown by the following general formula (3) and 8 parts of a polycarbonate resin ["PanliteL-1250", trade name; product of Teijin Chemicals Ltd.] in 90 parts of 1,2-dichloroethane. The solution was dried for 3 hours with warm air of 60° C., thereby forming a carrier transporting layer of 20 μ thick.

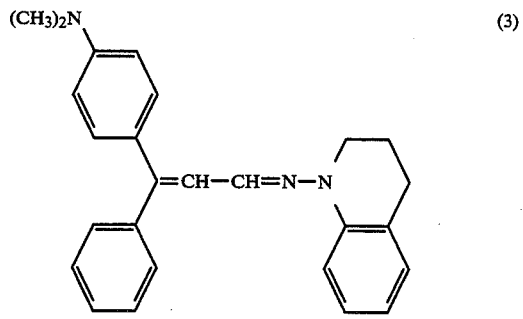

(3)

Characteristics of the electrophotographic photoreceptor were measured. The following results were obtained.

$V_D$: −710 (v)
$V_{D10}$ : 92 (%)
$E_{\frac{1}{2}}$: 2.8(lux-sec)

EXAMPLE 5 ~ 22

Photoreceptors were fabricated separately in the same manner as in Example 4 except that the following exemplified compounds were used in place of Exemplified Compound 5). Their characteristics are as follows.

| Ex. | Compound No. | $V_D$ (−V) | $V_{D10}$ (%) | $E_{\frac{1}{2}}$ (lux-sec) |
| --- | --- | --- | --- | --- |
| 5 | 6 | 700 | 72 | 2.1 |
| 6 | 7 | 690 | 89 | 3.6 |
| 7 | 12 | 700 | 87 | 2.3 |
| 8 | 13 | 700 | 92 | 3.1 |
| 9 | 17 | 700 | 93 | 3.5 |
| 10 | 19 | 710 | 75 | 3.5 |
| 11 | 21 | 700 | 81 | 2.7 |
| 12 | 22 | 690 | 87 | 4.2 |
| 13 | 24 | 700 | 86 | 2.5 |
| 14 | 28 | 710 | 90 | 4.7 |
| 15 | 29 | 700 | 77 | 3.8 |
| 16 | 37 | 700 | 81 | 3.1 |
| 17 | 41 | 690 | 87 | 2.9 |
| 18 | 44 | 700 | 76 | 3.7 |
| 19 | 47 | 710 | 93 | 2.2 |
| 20 | 50 | 700 | 88 | 4.1 |
| 21 | 54 | 710 | 95 | 2.4 |
| 22 | 55 | 690 | 80 | 3.0 |

EXAMPLES 23

The electrophotographic photoreceptor fabricated in Example 1 was repeatedly subjected 1,000 times to a charging-discharging cycle, so that variations in its characteristics were investigated. As readily envisaged from the following results, the electrophotographic photoreceptor was found to have excellent repeatability.

|  | 100th cycle | 1,000th cycle |
| --- | --- | --- |
| $V_D$ (−V) | 700 | 700 |
| $V_{D10}$ (%) | 91 | 90 |
| $E_{\frac{1}{2}}$ (lux-sec) | 2.8 | 2.7 |

EXAMPLE 24

An intermediate layer made of a vinyl chloride vinyl acetate-maleic anhydride copolymer ("S-LEC MF-10", trade name: product of Sekisui Chemical Co., Ltd.) and having a thickness of 0.03 μ was provided on an aluminum laminated polyester film (thickness of aluminum foil 10 μ). A dispersion, which had been obtained by dispersing 1 part of Exemplified Compound 1 and 1 part of copolymer of vinylchloride-vinylacetate-vinylalcohol (Union Carbide Company [VAGH]) in 60 parts of 1,4-dioxane by means of an attritor, was coated on the intermediate layer and then dried for 30 minutes with hot air of 120° C., whereby a carrier producing layer of 0.2 μ thick was provided.

A solution, which had been prepared by dissolving 10 parts of 2,5-bis(4-N,N-diethylamino-phenyl)-1,3,4-oxadiazole and 10 parts of a polycarbonate resin ("Iupilon S-1000", trade name: product of Mitsubishi Gas Chemical Company, Inc.) in 90 parts of 1,2-dichloroethane, was coated on the carrier producing layer, followed by drying for 3 hours with warm air of 60° C. to form a carrier transporting layer of 20 μ thick.

The $E_{\frac{1}{2}}$ of an electrophotographic photoreceptor thus obtained was measured. It was found to be 2.9 lux.sec. That electrophotographic photoreceptor was electrified by corona discharge at −6 KV in a dark place. After exposure to light of a maximum light intensity of 30 lux. sex to form a latent image, the latent image was developed by the magnetic brush development method, followed by transfer of the thus-developed image. As a result, vivid marks having sufficient contrast and good graduation were obtained.

Even when the copying test was repeated 10,000 times, the resultant marks remained good and no changes were observed thereon.

We claim:

1. In an electrophotographic photoreceptor having a photosensitive layer on a conductive substrate, said photosensitive layer comprising a carrier producing substance and a carrier transporting substance, the improvement wherein said carrier producing substance is composed of an azo compound represented by the following general formula (1):

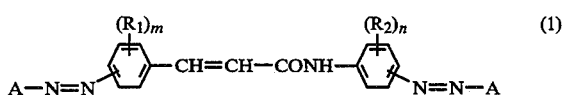

wherein A means a coupler residuum having phenolic OH radicals, R₁ and R₂ designate, respectively, a radical of an integer of, both, m=0~4, n=0~4, selected from the group consisting of hydrogen, halogen atoms, alkyl group, alkoxy group, and di-substituted amino group.

2. The photoreceptor as claimed in claim 1, wherein the carrier producing substance is composed of an azo compound represented by the following basical structure,

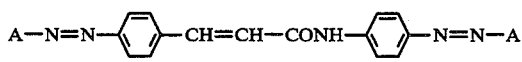

wherein A means a coupler residuum having phenolic OH radicals.

3. The photoreceptor as claimed in claim 1, wherein the carrier producing substance is composed of an azo compound represented by the following basical structure,

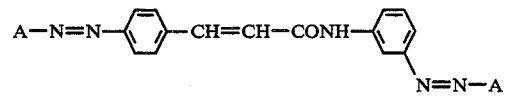

wherein A means a coupler residuum having phenolic OH radicals.

4. The photoreceptor as claimed in claim 1, wherein the carrier producing substance is composed of an azo compound represented by the following basical structure,

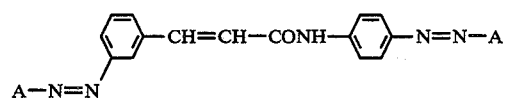

wherein A means a coupler residuum having phenolic OH radicals.

5. The photoreceptor as claimed in claim 1, wherein the carrier producing substance is composed of an azo compound represented by the following basical structure,

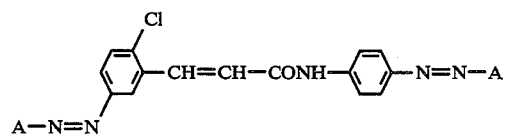

wherein A means a coupler residuum having phenolic OH radicals.

6. The photoreceptor as claimed in claim 1, wherein the carrier producing substance is composed of an azo compound represented by the following basical structure,

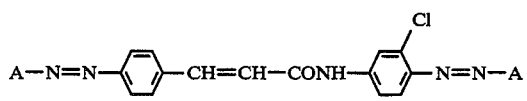

wherein A means a coupler residuum having phenolic OH radicals.

7. The photoreceptor as claimed in claim 1, wherein the carrier producing substance is composed of an azo compound represented by the following basical structure,

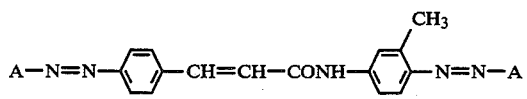

wherein A means a coupler residuum having phenolic OH radicals.

8. The photoreceptor as claimed in claim 1, wherein the carrier producing substance is composed of an azo compound represented by the following basical structure,

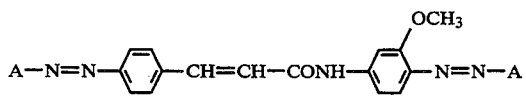

wherein A means a coupler residuum having phenolic OH radicals.

* * * * *